United States Patent [19]

Eselun

[11] Patent Number: 5,165,045
[45] Date of Patent: Nov. 17, 1992

[54] METHOD AND APPARATUS FOR MEASURING DISPLACEMENT HAVING PARALLEL GRATING LINES PERPENDICULAR TO A DISPLACEMENT DIRECTION FOR DIFFRACTING A LIGHT BEAM

[76] Inventor: Steven A. Eselun, 1240 12th St., Los Osos, Calif. 93402

[21] Appl. No.: 774,781

[22] Filed: Oct. 10, 1991

[51] Int. Cl.⁵ .............................................. H01J 3/14
[52] U.S. Cl. .................................. 250/237 G; 356/374
[58] Field of Search .......... 250/237 G, 237 R, 231.14, 250/231.16; 356/374

[56] References Cited

U.S. PATENT DOCUMENTS

| 4,836,681 | 6/1989 | Van Saders et al. | 356/374 |
| 4,979,827 | 12/1990 | Matsui | 356/374 |
| 5,075,560 | 12/1991 | Greivenkamp et al. | 250/574 |

Primary Examiner—David C. Nelms
Assistant Examiner—T. Davenport
Attorney, Agent, or Firm—Robert Samuel Smith

[57] ABSTRACT

A method and apparatus for generating and detecting changes in interference patterns such as may be used to measure small displacements. A collimated beam is diffracted to produce a standing wavefront along a surface. The surface is coincident with the surface of a device which emits a signal in response to changes in the intensity of the wave front. In one embodiment, the diffracting means is a grating and the signal emitting means includes a beam splitter that generates an interference pattern responsive to the intensity of the wave front. In another embodiment, the signal emitting means is a membrane that emits a signal in response to changes in the wavefront. The apparatus and method can be used in applications which include measurement of displacement and measurement of force in which no displacement takes place.

17 Claims, 4 Drawing Sheets

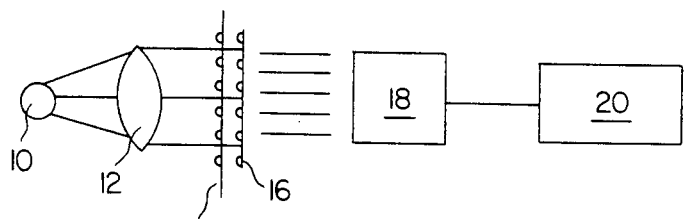
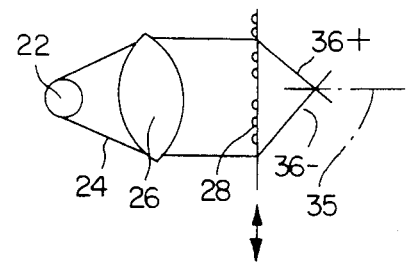
FIG. 1 PRIOR ART
FIG. 2
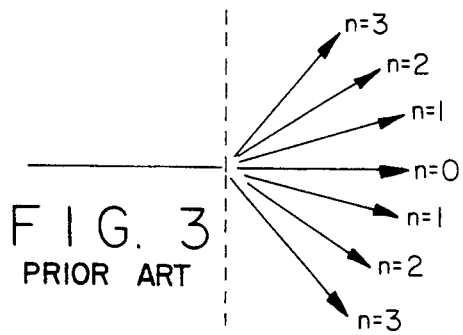
FIG. 3 PRIOR ART
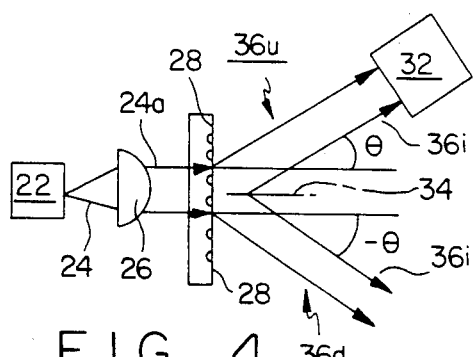
FIG. 4
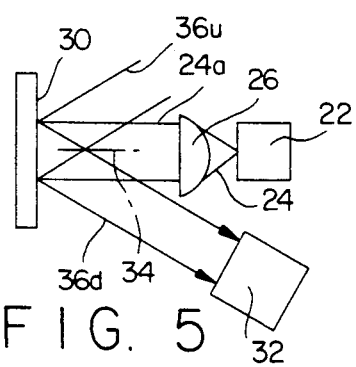
FIG. 5
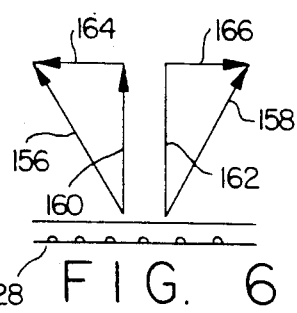
FIG. 6
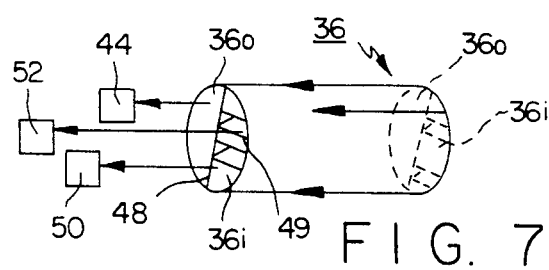
FIG. 7
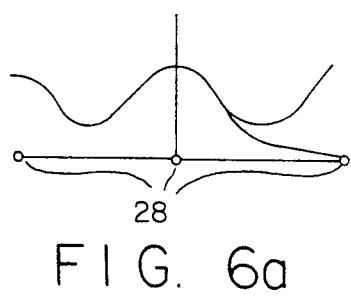
FIG. 6a
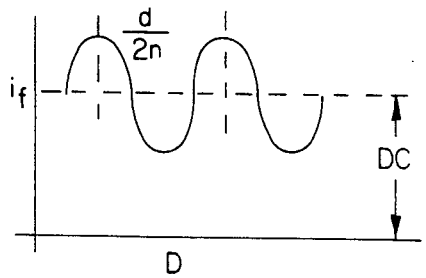
FIG. 8

METHOD AND APPARATUS FOR MEASURING DISPLACEMENT HAVING PARALLEL GRATING LINES PERPENDICULAR TO A DISPLACEMENT DIRECTION FOR DIFFRACTING A LIGHT BEAM

FIELD OF THE INVENTION

This invention relates to devices for measuring displacements and particularly to a device using a diffracted light beam for measuring very small displacements

PRIOR ART AND INFORMATION DISCLOSURE STATEMENT

Progress in many areas of high technology involves an ability to measure very small displacements such as deformation of a frame which is part of a sensitive weighing balance, displacement of a diaphram used to measure changes of pressure, measurement of members of a disk file wherein differences in coefficients of expansion of adjacent components can impede performance, machining where close tolerances of machined parts are required.

Apparatus that precisely measure displacement have been developed using light fringe patterns. Two types of apparauts have been developed. One type utilizes shadowcasting to produce Moire patterns. The second type utilizes interference between coherent light beams.

The type of apparatus utilizing the use of two gratings to produce moire patterns is illustrated in FIG. 1. A beam of light from source 10 collimated by lens system 12 passes through two gratings 14 and 16 each having slightly different line spacings so as to produce a Moire pattern incident on the photocell system 18 resulting in an electronic signal that is processed by signal processing system 20. As the grating 14 is displaced relative to grating 16, a periodic signal is developed. Typical values of the resolution of the displacement that characterizes this type of measuring device equals the line spacing divided by four.

Interference patterns may be generated by either one of two general techniques. One technique involves directing a beam onto a partially reflecting surface boundary between a first and a second medium so that part of the beam passes only through the first medium and the remaining part passes through the second medium and then is recombined with the first beam part to produce a diffraction pattern that is dependent upon the difference in path lengths travelled by the two parts of the beam.

U.S. Pat. No. 3,756,723 to Hock discloses an instrument of this type in which a beam is reflected from a beam splitter onto a reflection grating, (the displaced element) where the beam is diffracted. Then pairs of a low order of the beam are recombined by passing the beam back through the beam splitter, a system of prisms and a second grating.

Another technique for producing a diffraction pattern is to impose an opaque target (e.g., a grating) in the path of a light beam which produces a scattered beam pattern that depends on the outline shape of the target boundary projected in the direction of the initial beam.

In order to explain the relation between intensity and angle of scattering of the scattered beam it is useful to review some fundamental concepts regarding the nature of a light beam diffracted by a grating.

A light beam is an electromagnetic field having an amplitude, A, which oscillates so as to comprise a wave in which the direction of propagation of the wave is perpendicular to the electromagnetic field. The intensity of the beam equals the square of the amplitude.

Consider a light beam perpendicularly incident on a grating, i.e., parallel straight lines, lying in a plane perpendicular to the incident beam and spaced a distance, s, between neighboring lines. A cylindrical coordinate system may be defined with the center of the grating at the origin and having polar coordinates R and $0.0=0$ is the direction of a beam perpendicularly incident on the grating. A beam incident on the grating will be "diffracted" i.e., the beam will be split into beams emanating from the grating as shown in FIG. 3. The N th order diffracted beam will be directed at an angle, $\theta n$ given by:

$$\phi n = \arcsin(n2\pi\lambda/s)$$

where
$\lambda$ = the wavelength
n = the order of the diffracted beam.

The amplitude of the vibrating field of the n th order beam relative to the direct transmitted beam having amplitude $A_o$ is given by $$An = Ao \exp(\phi n)/n$$

The intensity of the n th order beam is $$J = \{Ao \exp(\phi n)\}\{Ao \exp(-i\theta n)\}$$

If the grating is made of opaque lines in which the width of each line equals the open space between the lines (i.e., a 50% duty sycle) then only beams having an odd value of n will appear. As the duty cycle deviates either above or below 50%, the intensity of the odd harmonics is diminished and the intensity of the even harmonics increases.

The displacement phase angle, $\Theta n$, of the n th order beam relative to the phase of all of the diffracted beams for a constant value of R is given by:

$$\Theta n = +2nx/s$$

where x is the position of the scale relative to the origin.

The + − denotes that as the scale moves, the +n and −n beams lead and lag the zero order beam respectively.

The circuit and method for processing the signal from this type of encoder is disclosed in U.S. Pat. No. 4,630,928 to Klingler which describes a glass scale fixed between an optical transmitter and receiver which is responsive to a direct beam from the transmitter.

U.S. Pat. No. 4,385,836 to Schmitt is for a position measuring device based on this principle which includes a scanning unit that generates counterphase scanning signals from an illuminated scale subject to displacement and an evaluating circuit that generates a scanning signals.

In U.S. Pat. No. 4,479,716 to Nelle, reference marks are included on the grating which are detected by the scanner to reference the position of the grating.

In the devices discussed supra, where the grid spacings of the scale and scanning plate are identical, optimal optical signals are generated only at a certain precise close separaton of the scale and scanning plate. U.S. Pat. No. 4,297,033 to Nelle is for a device including a measuring scale having a line grid with a coarse spacing which is a multiple of the spacing of a scanning grid with the result that the scale and scanning grids may be separated at a greater distance with less stringent tolerance than is the case wherein spacing of the scale and scanner are equal.

U.S. Pat. No. 3,738,753 to Huntley discloses a method for forming and inexpensive grating by forming a holographic image.

In addition to the requirement to maintain a precisely close separation of scale and scanner in these types of devices, there are the additional problems that d. c. levels and the amplitudes of the signals change thereby complicating the processing of the signal.

Displacement of the interferometric type such as described supra are expensive and, because of the delicate nature of their construction, are not really suited to environments such as machine shops where a certain degree of ruggedness and simplicity of construction is an asset.

THE INVENTION

Objects

It is an object of this invention to provide a device for measuring displacement with a resolution that is less than the wavelength of light.

It is another object that the device of this invention for performing the measurement be characterized by fewer critical parts resulting in simplicity of construction and to provide reduced cost and greater ruggedness compared to the devices of the prior art.

It is another object that the device not be characterized by the problems resulting from variation of the light level that characterize devices of the prior art.

It is another object to provide an electronic circuit for analyzing the intensity of the light signal received by the photodetectors of the device that eliminates errors associated with devices of the prior art such as are due to changes in the relative amplitudes of the sine and cosine signals used in detecting direction of motion.

It is another object to provide a device that determines displacement from high order beams thereby providing that the scale can be read with increased sensitivity compared to devices of the prior art.

It is another object to provide an apparatus that does not require close precise position between the grating and scanning device as is required with apparatus of the prior art.

It is another object to measure the higher order diffraction beams than can be done with devices of the prior art wherein, in devices of the prior art, a beam is diffracted and then split in order to measure small displacements.

Summary

This invention is directed toward an interferometric device in which a collimated light beam passes through a grating producing two coherent beams of an order of diffracted light in two directions. Although I do ot wish to be bound by theory, my concept is that a standing wave is generated just beyond the grating and parallel to the direction of motion of the grating. It is phase locked to the grating position. Sensing this phase in relation to a fixed plane results in a displacement measurement.

In one embodiment, the intensity of the standing wave is measureed by a transmitting membrane that emits a signal in response to light transmitted through the membrane. The membrane is positioned perpendicular to the grating surface and parallel to the grating lines. The direction of motion of the grating is determined using two such detectors.

In another embodiment, the intensity of the standing wave is measured by recombining the two coherent beams with a beam splitter which is then directed onto a photodetector assembly.

Displacement of the grating relative to the beam splitter produces changes in the light signal from the photodetector which are processed electronically to evaluate the displacement.

Novelty in the invention lies in the arrangement for producing the interference pattern and sensing intensity of the standing wave. The arrangement can be put to a number of uses, one of which is measuring displacement and another of which is measuring force in the absence of displacement.

In one embodiment for processing displacement of the grating, several beam splitters and photodetectors are used. Two additional beam splitters and three photodetectors are arranged to receive the beam from the first beam splitter to process the signal. Signal processing includes detecting the dc level of the joined beam and generating separate sine and cosine signals (i.e., signals in quadrature with one another) as functions of a displacement phase to determine direction of motion of the grating. The displacement phase is proportional to the displacement of the grating.

In a second embodiment for processing the light signal and determining the direction of motion of the grating, the beam splitter is mounted on a piezoelectric oscillator whose direction of vibration is parallel to the direction of motion of the grating. Consequently, the pattern of light oscillates so that the photodetector emits an a,c, signal that is processed electronically. This method of analysis eliminates problems of analysis caused by changes of the light intensity from the light source (the "dc" level) and differences of the amplitude of the generated sine and cosine signals.

DRAWINGS

FIG. 1 shows the method of generating Moire patterns to measure displacement acccording to the prior art.

FIG. 2 shows formation of the standing wave.

FIG. 3 shows diffraction of a beam to produce orders of diffracted beams.

FIG. 4 shows the "transmission" version of the invention.

FIG. 5 shows the "reflection" version of the invention.

FIG. 6 illustrates the generation of the standing wave by a diffraction grating.

FIG. 6A shows the mixed and unmixed portions of the diffracted light beam.

FIG. 7 shows a section of the diffracted light beam in perspective with arrangements of the photodetectors to analyze the interference pattern.

FIG. 8 shows the signal generated by the apparatus as shown in FIG. 6 incident on the photodetector 32.

DESCRIPTION OF PREFERRED EMBODIMENTS

Figure 9:
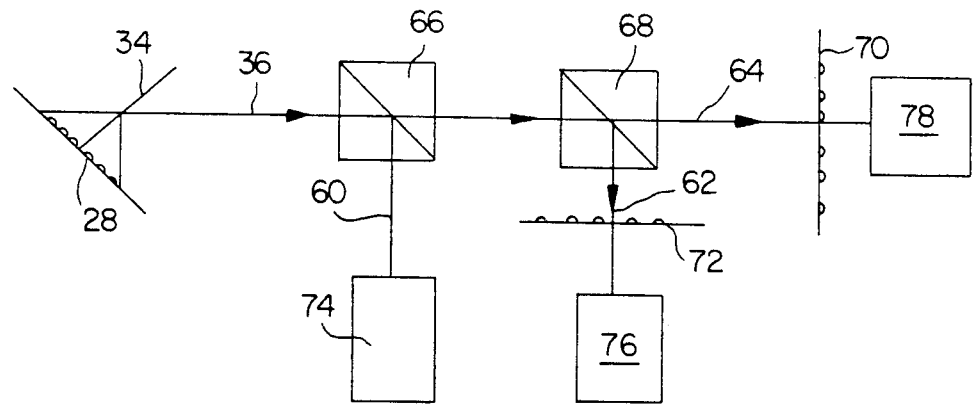
FIG. 9 shows an arrangement using photodetectors, gratings and beam splitters to analyze the light beam.

The following detailed description illustrates the invention by way of example and not by way of limitation of the principles of the invention. This description will clearly enable one to make and use the invention and describes several embodiments, adaptations modifications, etc., including what I presently believe to be the best mode for carrying out the invention.

Turning now to a discussion of the drawings, FIG. 4 shows a "transmission" embodiment and FIG. 5 shows a reflection embodiment of the invention for detecting displacement of a grating 28. In both FIG. 4 and FIG. 5 there is shown a laser 22 emitting a light beam 24 through a collimating lens system 26 incident on a transmissive scale 28 in FIG. 4 and a reflective scale 30 in FIG. 5.

When the spatially coherent light beam 24a meets the scale lines or bumps, a far-field pattern of diffracted light beams emerges as shown in FIG. 3 although only one diffraction beam 36, is shown in FIG. 4 and 5. For each beam of order n reflected at a positive angle with respect to the zero order, there will be a beam of order −n reflected at a negative angle with respect to the zero order.

Although I do not wish to be bound by theory, an explanation of the optical interactions that enable this invention may be considered with reference to FIG. 6 and 6a by visuallizing the standing wave as comprising ccomponents of two beams 156 and 158, the one diffracted toward the left and the one to the right. Each beam can be resolved into orthogonal components, one component 164 or 166 parallel to the grating 28 and one 160 or 162 perpendicular to the grating. Al illustrated in FIG. 6a, component 164 is phase locked to the grating, i.e., if the grating moves, the phase moves. Component 166 of diffracted beam 158 is likewise composed of a travelling wave 162 and a perpendicular travelling wave component 166 moving in the direction opposite to component 164. Combining the two waves, we get a travelling wave going in the direction of the original beam and a standing wave pattern in the direction parallel to the grating surface and perpendicular to the grating lines formed from the two wave components travelling in opposite directions. This results in an intensity modulation in this direction at twice the grating spacing as shown in FIG. 6a. The maxima and minima of this pattern move in space precisely with the linear motion of the grating.

Figure 13:
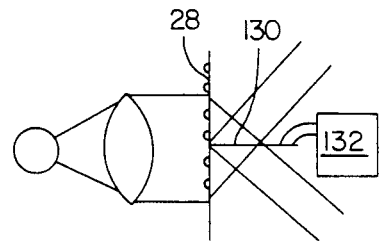
FIG. 13 shows a transmission detector for measuring the intensity of the standing wave.

FIG. 13 shows one embodiment of this invention in which the intensity of the standing wave is measured by a transmitting membrane 130 which generates a voltage that is proportional to the intensity of transmitted light that is read by meter 132. The membrane is positioned perpendicular to the grating and parallel to the grating lines so that the intensity of the standing wave intersected by the membrane is constant over the surface of the membrane and dependent on the location of the membrane with respect to distance parallel to the grating and perpendicular to the grating lines.

Only one membrane and meter 132 is shown in FIG. 13 however a second membrane (not shown in FIG. 13) parallel to membrane 132 and a second meter to detect the signal from the second membrane would be incorporated in order to detect direction of motion by comparing the displacement phases of the signals from the two membranes.

The second embodiment for measuring the intensity of the standing wave is shown in FIGS. 4 and 5.

FIG. 4 shows the collimated beam transmitted through the scale to the detector 32. Transmissive scale 28 is typically a pattern of regularly spaced lines of chrome deposited on a transparent substrate of glass or quartz. Another scale of the transmissive type can also be prepared by applying photoresist to the surface of a transmitting medium and etching (embossing) the line pattern. The depth of the etch pattern is controlled to provide a thin area (the lines) and a thick (unetched area) such that the phase of the light wave passing through the thick area lags the phase of light passing through the thin area by 180 degrees.

Scale 30 in FIG. 5 is another type of scale in which the inccident beam is reflected from an opaque surface with a grating.

The transmissive type of scale 28 generally provides twice as strong a signal to the photodetecting system as the reflective type of scale 30.

In both FIGS. 4 and 5, a beam splitter 34 is shown perpendicular to the surface of the scale and oriented parallel to the lines on the scale. The edge 34a of the beam splitter 34 is typically 0.04 inches from the surface of the grating.

As shown in FIG. 4 (or 5) the beam splitter 34 bisects the diffraction beam 36 so that a portion of each diffraction beam 36u and 36d is transmitted and reflected by the beam splitter. The inside half 36i of the diffraction beam contains interference fringes because of interference between the reflected and transmitted portions of the diffraction beam 36. This interference pattern is determined by the wavefront of the original beam and the angle $\alpha$ between the beam splitter and the scale lines.

The cross section of the resultant light pattern on a photodetector 32 intercepting the diffraction beam 36 in FIGS. 4 and 5 is shown in perspective in FIG. 7. The outside area 36o is uniformly illuminated while the inside area 36i shows a pattern of interference fringe lines. Orientation of the fringe lines is controlled by the precise angular adjustment of the beam splitter. The fringes in the inside half 36i of the upwardly going diffracted beam can result from combining two beams. One is the lower half of the input beam 36u which is upwardly diffracted as shown in FIG. 4 and partially transmitted by the beam splitter and the other is the upper half of the incoming beam 36d which is downwardly diffracted and partially reflected by the beam splitter as the scale moves.

Fringes also exist on the inside portion of the downwardly going beam 36d. When the grating moves a distance x relative to the beam splitter, the fringes move indicating a change in the displacement phase, $\Theta n$, which was given in foregoing paragraphs as $\Theta n = 2\pi n x / s$ where n is the order of the diffracted beam, x is the displacement of the grating, and s is the space between lines of the grating.

If the scale is displaced one cycle, these interference fringes move two cycles as shown in FIG. 6a. This movement of the fringes is picked out as indicative of movement (or position) of the grating.

The beam diffraction angle must be such that light transmitted and reflected by the beamsplitter are somewhat equal. Low beam angles (less than fifteen degrees) are to be avoided since it is difficult to transmit much light through the beam splitter. Also vertical polarization of the collimated beam 26 (FIGS. 1 and 2) is preferred because the vertical component is more strongly transmitted.

The beam amplitude must be sufficient to be cleanly detected. The wavefront quality of the original beam formed by simply collimating the beam from a laser diode with a positive achromat, has sufficient symmetry to produce excellent phase uniformity of the wave front over the entire region of interference (i.e., the beam diameter). surface). Therefore, a good electronic signal results from integrating (with a lens) the beam onto a photoconductor from which a strong electronic signal may be obtained.

FIG. 8 is a graph showing a typical photocurrent signal, ip, generated by displacement, D, of a grating relative to the beam splitter wherein the spacing of the grating is d and the order of reflection is n. The FIG. 8 illustrates a major advantage of the invention over devices of the prior art in that the distance between peaks is d/2n. I.e., resolution is improved with the higher orders whose use is made possible with this invention.

A number of methods and circuits may be devised for determining the displacement, x, in terms of the electronic signal of FIG. 8. All of these methods and circuits are embodiments of this invention. Four preferred methods are described in the following paragraphs.

METHOD 1

The first method is illustrated in FIG. 7 wherein the diffracted beam includes an outer portion 36o which has not encountered the beam splitter and is incident on photodetector 44 and an inner portion 36i, which is the combination of transmitted and reflected portion of diffracted beam 36 from the beam splitter 34. Photodetectors, 50 and 52 intersect two different areas 48 and 49 respectively of inner beam 36i in order that the signal from photodetector 50 be in quadrature with the signal from photoconductor 52 i.e., the displacement phase of the signal from photoconductor 50 is displaced 90 degrees from the signal from photoconductor 52). This is necessary in order to determine the direction of change of displacement x. By adjusting the orientation of the beam splitter, the relative angle between the transmitted and reflected components of the beam is adjusted. This angle modifies the shape of the interference pattern (the stripes shown in area 36i of FIG. 7). The plane of the beam splitter is chosen to be a small angle to the plane at right angles to the scale surface and parallel to the grating lines. This results in light and dark bands which move vertically through the beam as the scale is moved in a direction parallel to its surface and perpendicular to the grating. lines. With such signals, the digital tracking circuit (described below) can generate bi-directional pulses at subincrements of the signal period, effectively interpolating between cycles.

A detector 44 which intercepts the "unmixed" outer portion of the beam, is used in a servo loop to normalize signal from the diffracted beam to a constant value. Changes in the grating duty cycle (ratio of opaque to transparent region), dirt, etc. can change the intensity of the diffracted beam so that compensating for these effects such as by means of a servo loop including detector 44 and the beam source 22 (FIGS. 2, 4, 5) can be used to maintain a fixed total light incident on the photodetecting system.

METHOD 2

Figure 15:
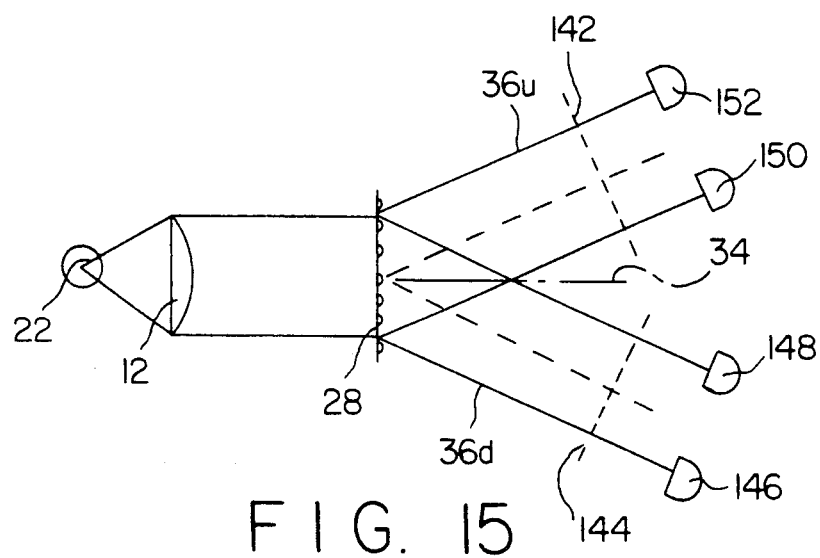
FIG. 15 is an arrangement using gratings to measure displacement.

A second apparatus for analyzing the beam whose crossection is represented in FIG. 7 is shown in FIG. 15. There is shown a light source 22, lens 12, first grating 28, and beam splitter 34 to produce two diffracted beams 36u and 36d whose crossectional pattern of intensity was discussed in connection with FIG. 7. Two masks, 142 and 144, are shown intercepting beams 36u and 36d respectively. The masks are alternating line areas of transmission and opaque line areas so that the mixed portions of beams 36u and 36d on masks 142 and 144 respectively form Moire patterns that are described by detectors 150 and 148 respectively.

Figure 16:
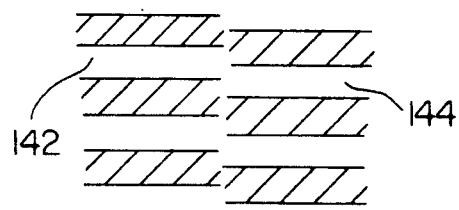
FIG. 16 shows relative positions of the lines of gratings 142 and 144.

The beam splitter 34 is orientationally adjusted relative to the lines of grating 28 so that the fringes in beams 36u and 36d are parallel to the plane "of the paper on which FIG. 15 is drawn". Therefore the lines forming the masks 142 and 144 are also parallel to this plane. As shown in FIG. 16, the line elements of the gratings 142 and 144 are shifted relative to one another in the direction perpendicular to the paper by one fourth of a cycle of the spacing of the gratings 142 and 144. With the masks positioned thusly, the signals, A and B, from gratings 142 and 144 respectively will be in quadrature (sine and cosine) relationship to one another and are the signals inputted for electronic analysis to the circuit shown in FIG. 14 and discussed subsequently.

The signals to the "outside" detectors 146 and 152 are from the "unmixed" portion of beam 36u and 36d as discussed in connection with FIG. 7 and are insensitive to micro displacement of grating 28. These signals are used to servo the laser power to maintain constant intensity of the initial beams. The gratings 142 and 144 may comprise high contrast photographic filters.

A simplified analysis of the signals from either method 1 or method 2 may be performed by assuming that the beam prior to mixing has a uniform amplitude distribution.

Figure 14:
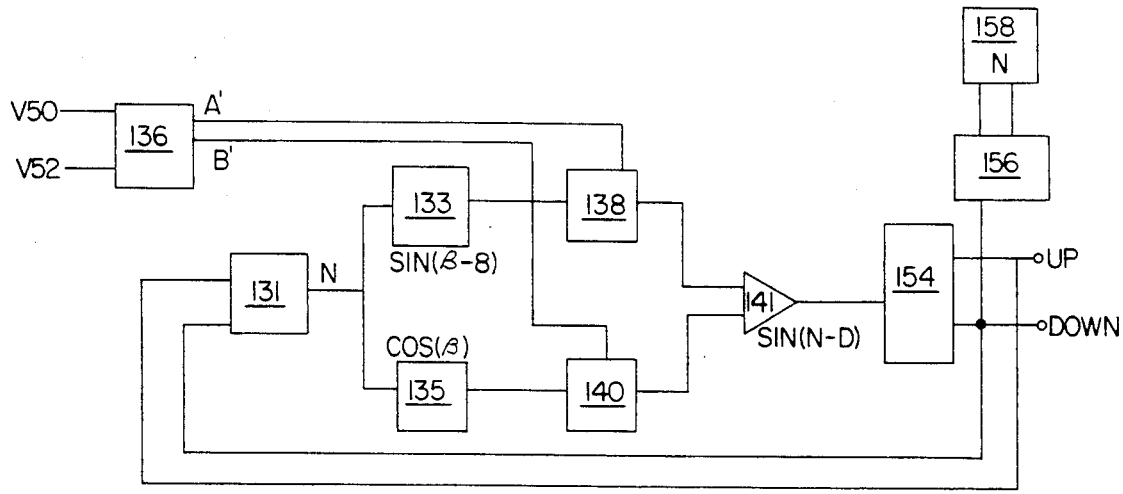
FIG. 14 is an electronic circuit for analyzing the detector signals.

This technique adds and subtracts the voltages (V50 and V52) from detectors 50 and 52 (from FIG. 7) or 148 and 152 (from FIG. 15) using techniques such as the electronic circuit shown in FIG. 14 described in following paragraphs.

First, the dc component of each is subtracted out. This component will vary only slightly since the total received light is sensed and fixed. In addition, the amplitude (that portion that varies cyclically with scale movement) of each signal is equalized.

The voltages from detectors 50 and 52 or 148 and 150 can be represented respectively by:

$$V50 = [\sin(\pi a a//2\lambda) \cos(\theta_m + \pi a a/2\lambda)]\pi a a/2$$

and $$V52 = [\sin(\pi a a/2) \cos(\delta - \pi a a/2\lambda)]/\pi a a/2$$

where
$\theta_m$ = phase of interference pattern
$\pi = 4\pi$ nx/s (displacement phase)
a = total vertical height of the detector
$\alpha$ = beam mixing angle expressed in radians
x = scale position
$\lambda$ = laser wavelength These relations show that the phase relationship between V50 and V52 depends on $\alpha$, the mixing angle. Notice that if $\alpha = \lambda/2a$ then V50 and V52 are ninety degrees out of phase as desired. But if this angle is varied slightly, the sine-cosine relation is perturbed and so are the signal amplitudes.

If instead of working with V50 and V52 directly, the sum and difference of V50 and V52 is determined $$A' = V50 + V52 = [\sin(\pi\alpha a/\lambda)\cos\theta_m]/(\pi\alpha a/\lambda)$$

and $$B' = V50 - V52 = -[\sin^2(\pi\alpha a/2\lambda)\sin\theta_m]/\pi\alpha a/2\lambda$$

Now, if $\alpha$ varies, only the amplitudes of the signals if affected. The sine-cosine relationship is maintained.

In order to determine the displacement phase, $\theta_m$, of A' and B', A' and B' are each multiplied respectively by sin N and cos N where N is a trial phase variable. In this manner, a table of values of a function, F(N), of N vs. N. is formed where $$F(N) = \sin(-N)\cos(\theta_m) + \cos(N)\sin(\theta_m) = \sin(\theta_m - N) \text{ Thus, } F(N) = 0 \text{ where } N = \theta_m$$

FIG. 14 shows the circuit for analyzing the signal. Signals A and B are converted to signals A' and B' by Offset Gain Adjust 136, then applied to multiplying digital-analog convertors 138 and 140 respectively. Pulses from up-down ring counter 131 are applied to Eprom 133 whose output is $$V' = \sin(N)$$

and Eprom 135 whose output is $$V'' = \cos(N).$$

V' and V'' are multiplied by A' and B' in D/A converters 138 and 140 respectively and these products are added by adder 141. The output from adder 141 is proportional to $$F(N) = \sin(\theta_m - N)$$

as discussed above so that F(N) = 0 when N = $\theta_m$

F(N) is gated into pulse generator 154 whose output has been generating pulses N and feeding the pulses back to counter 131. Therefore, when F(N) = 0, at a given value of N' equal to displacement phase $\theta_m$ of the grating position, pulses from generator 154 cease. The total number of counts corresponding to N' is inputted into counter 156 and displayed on display 158.

The foregoing methods 1 and 2 are subject to a possible problem. If the DC intensity levels between the sections 46, 48 and 49 vary independently from one another, inaccurate electronic interpolation would result and could limit system accuracy.

Method 3 is an arrangement which eliminates this possible source of inaccuracy although the signal level is reduced.

METHOD 3

The arrangement for method 3 is shown in FIG. 9. In method 3, only one side of the diffraction beam (36u or d) is used for analysis. It contains the mixed inner region and outer region and is split into three beams 60, 62 and 64 by beam splitters 66 and 68. The beam splitter 34 is aligned as in FIG. 4 to produce the beam 36 as before. The alignment angle of beam splitter 34 is chosen to produce interference fringes having the same spacing as the lines on gratings 70 and 72. Detector 74 is used to servo the laser power. Many fringes will fall on detector 74, however their motion will not be evidenced in the detector signal. Detectors 76 and 78 have grating 72 and 70 placed in front of them respectively. The signals from detectors 76 and 78 correspond to signals V50 and V52 discussed supra and may be analyzed using the same circuitry (FIG. 14) used to analyze the signal from methods 1 and 2. A Moire pattern from the grating and interference pattern is generated by each grating, 70 and 72. Grating 72 is adjusted perpendicular to its lines to give a signal from 76 that is ninety degrees out of phase with the signal from 70.

Since the same beam is sampled by each detector, DC light problems are avoided.

METHOD 4

Figure 10:
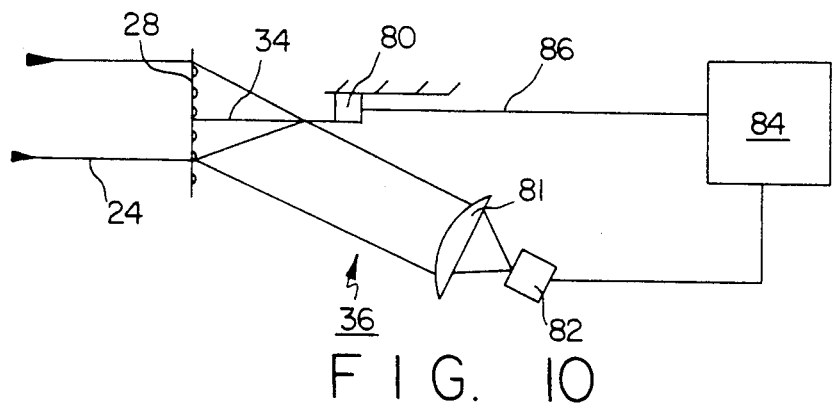
FIG. 10 shows an arrangement for analyzing the mixed diffraction beam using a beam splitter mounted on a piezoelectric crystal.

A fourth method for generating a signal responsive to displacement of the scale and determining direction of displacement is shown in FIG. 10. The beam splitter 34 is mounted on a piezoelectric oscillator 80. A collimated beam 24 is incident on scale 28 which generates diffraction beam 36 focussed by integrating lens 81 onto photodetector 82. The signal from only one photodetector 82 is processed by processor 84 which also impresses drive power on piezo oscillator 80 via line 86.

When piezoelectric oscillator 80 vibrates thereby causing the grating 28 to move back and forth parallel to the direction of displacement, an ac signal is generated that is impervious to DC level changes and amplitude changes of the beam. Positive and negative counts representing the sinusoidal shape of the signal as a function of position are measured.

Figure 11:
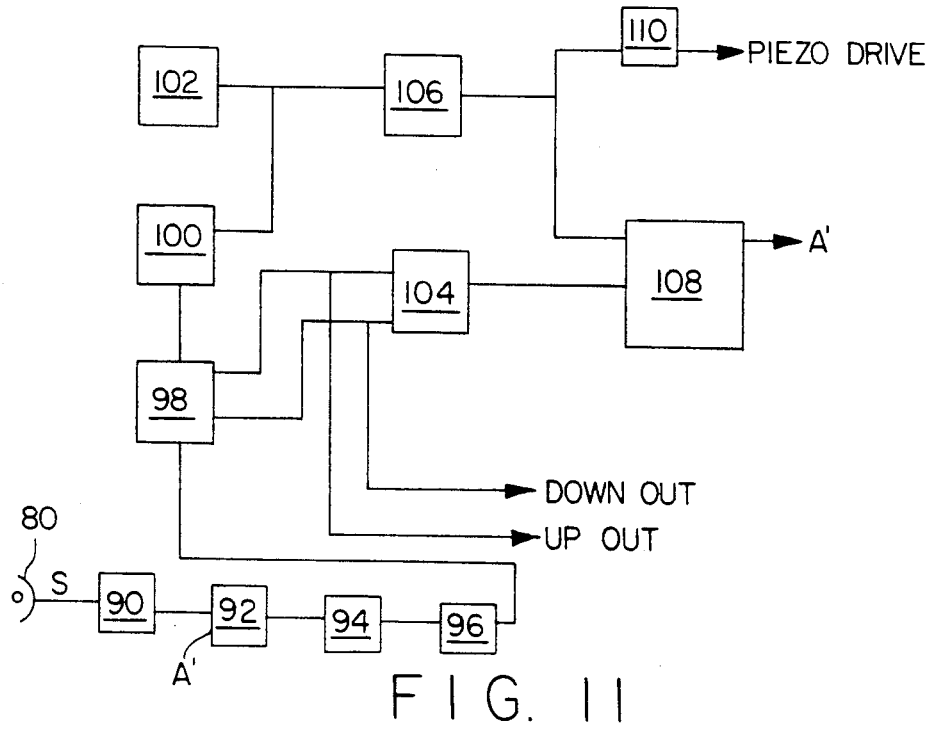
FIG. 11 shows a circuit for analyzing the signals from FIG. 10.

FIG. 11 is a schematic circuit diagram that may be used to analyze the signal from the photodetector in accordance with method 3.

Referring to FIG. 11, a clock 102 emits pulses that are divided by counter 106, amplified by amplifier 110 and imposed on the piezoelectric driver (not shown) thereby causing the beam splitter 80 (FIG. 10) to oscillate in the path of the beam at a frequency f and amplitude of motion D. Therefore the beam splitter follows a displacement of D sin $\omega t$ parallel to the surface of the scale and perpendicular to the lines of the scale causing the fringe pattern incident on photodetector 80 (diffraction beam 36) to oscillate.

A signal S is thereby generated by the photodetector 80 where, $$S = A + B\cos(\theta_m - \phi\sin t) \text{ and}$$
$$= \text{grating phase to be measured.}$$
$$= 2/\frac{\pi_m x}{S} = (\text{line spacing})/2n$$
$$\phi = \text{amplitude of the time dependent component of } S.$$

The signal, S, is sent from photodetector 80 to high pass filter 90, multiplying digital-to-analog convertor 92.

The output from the divider 106 is also imposed on six address lines of Eprom 108 together with pulses on eight address lines from ring counter 104. The counter value will track. The resolution of $2\pi mx/\lambda$ is given by the modulus of counter 104. The gate 98 will emit up and down pulses necessary to keep the output of the low pass filter 94 near zero volts. These pulses keep the counter 104 locked to $\theta_m$. They are used as outputs to conventioal up/down counters.

Eprom 108 is conditioned to emit signal A' where $$A' = \{[J_2(\phi)/J_1(\phi)] \sin \theta_m \sin \omega t + \cos \theta_m \cos 2\omega t\} \div \{[J_2(\phi)/J_1(\phi)] + 1\}$$

A' is input to multiplying D-A convertor 92.

The clock 102 also sends timing pulses via one shot multivibrator 100 to gate 98 thereby turning gate 98 on to receive counts from the level select clipper 96. Sixty four pulses are emitted during each excursion of the beam splitter thereby setting the overall response time.

In the foregoing paragraphs, several embodiments have been described which meet the objects of the invention. The crux of the invention is a means for irradiating a diffraction means to generate an interference standing wave pattern of light combined with a means for detecting changes in the diffraction pattern such as might be cause by displacing the diffraction means relative to the detecting means.

In the embodiments discussed supra, the diffraction means is a grating and the detecting means is a beam splitter. The grating generates a standing wave front comprising positive and negative order diffraction beams. The beam splitter, irradiated by the wave front, superimpose each order of diffraction beam directed at a positive angle with respect to the initial beam onto the same order diffraction beam directed at a negative angle with respect to the original beam thereby creating the desired interference pattern in which the higher order diffraction beams are characterised by sufficient intensity to permit analysis by signal processing means. Since higher order diffraction beams are involved in the analysis, resolution in the analysis of the interference pattern is greater than in devices of the prior art in which the beam is first incident on a beam splitter and then directed onto a diffraction grating. Furthermore, the construction of the device of the present invention is inherently less expensive than devices of the prior art intended for the same purposes.

This invention can be applied to a number of uses, particularly the determination of small displacements. For example, measurement of displacement of a grating relative to a beam source has been described in foregoing paragraphs. In this application, the grating may be attached to a precision stage.

Figure 12:
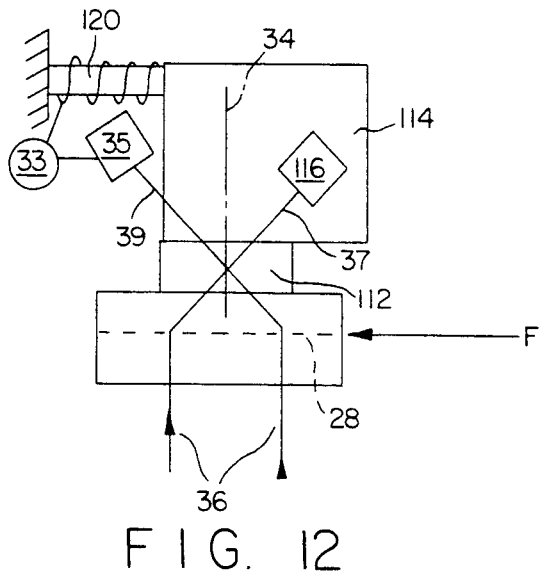
FIG. 12 shows an embodiment of the invention for measuring force.

Another application of the device would be in a force balance. In this application, illustrated in FIG. 12, the grating 28 is supported on a movable base 112 which is supported on a second movable base 114 that also supports the beam splitter 34 and photodetecting system 116 that intercepts a positive order diffraction beam 37. A second photodetection system 35 is placed to intercept the negative order diffraction beam 39. When a force F to be measured is applied to the grating support, thereby moving the grating 28 relative to the beam splitter 34 and first photodetection system 116 to a position determined by the applied force F, the signal to the second photodetection system 35 also changes and this signal is servoed to a restoring force system that restores the grating to its original position. In the embodiment presented in FIG. 12, the restoring force (which is equal and opposite to the applied force) is provided by a voice coil 120. The magnitude of the force is read out by meter 33 in terms of the current that is supplied to the voice coil 120.

Several methods have been disclosed for interpreting the signal to determine the direction and magnitude of the displacement.

One method involves placement of three or four photodetectors at three separate locations in the diffraction beam cross section in order to normalize the signal level and to generate two signals. One signal is proportional to cos and the other signal is proportional to sin where $=4\pi$ nx/s where x is the displacement of the grating so that these two signals may be used to determine the magnitude and direction of displacement.

Another method involves splitting the mixed diffraction beam into three beams using two additional beam splitters and gratings to create a pair of Moire patterns that direct out of phase signals onto three photodetectors. Two out of phase signals are generated from which direction and magnitude of displacement can be determined.

A third method involves mounting the beam splitter on a piezoelectric oscillator so that periodic displacement of the beam splitter generates a time modulated displacement signal that permits determination of the magnitude and direction of displacement of the scale relative to the beam splitter.

It should be understood that various modifications within the scope of this invention can be made by one of ordinary skill in the art without departing from the spirit thereof. I therefore wish my invention to be defined by the scope of the appended claims and in view of the specification if need be.

I claim:

1. An apparatus for measuring displacement of a first base relative to a second base in a direction of displacement which comprises: means for emitting a light beam in an initial direction perpendicular to said direction of displacement, a grating means secured to said first base including a flat surface substantially perpendicular to said initial direction with parallel grating lines perpendicular to said displacement direction for diffracting said light beam thereby generating a plurality of pairs of ordered diffraction beams wherein one said diffraction beam of each said pair is directed in a diffracted beam direction that is perpendicular to said grating lines and located at an angle that is positive with respect to said initial light beam direction and said other diffraction beam of said pair is similarly directed at said angle that is negative with respect to said initial light beam direction;

a means secured to said second base for producing a signal responsive to a light pattern distributed on a plane that is substantially perpendicular to said grating surface and parallel to said grating lines and said initial beam direction;

a means for analyzing said signal to present a displacement signal representing said displacement.

2. An apparatus as in claim 1 wherein said signal producing means comprises:

a means for splitting each one of said pairs of diffraction beams along said plane arranged in operable combination with said grating means to provide that a portion of each said diffraction beam of any one of said pairs is redirected to interfere with said other diffraction beam member of said pair thereby providing that each diffracted beam includes a beam portion that is a mixture of said redirected portion interfering with a nonreflected portion of said diffracted light beam.

3. An apparatus as in claim 1 wherein said grating means comprises a mediun with said flat surface and said medium is transparent and has a side opposite said surface with said beam emitting means facing said side providing that said initial beam will pass from said side to said surface where said grating lines are located.

4. An apparatus as in claim 1 wherein said flat grating surface is a reflecting surface facing said light emitting means.

5. An apparatus as in claim 2 wherein:
said beam splitting means is a second medium that is transparent and has a flat beam splitting surface that partially transmits and partially reflects light and is coincident with said plane.

6. An apparatus as in claim 1 wherein said beam emitting means comprises a laser.

7. An apparatus as in claim 2 wherein said light signal detecting means comprises:
a first photodetector means located to intercept said unmixed light portion thereby producing a dc signal that is proportional to intensity of said emitted light beam;
a servo means in operable combination with said first photoconducting means and said light emitting means for receiving said first photodetector signal and maintaining a constant intensity of said emitted light beam;
a second photodetector means in operable combination with said beam splitter means to intercept a first part of said mixed light portion and provide a first mixed light signal whose value is equal to $$A \cos (Bx+C)$$

where Bx is a displacement phase of said first mixed light signal and A, B and C are constants independent of said displacement x;
a third photodetector means in operable combination with said beam splitter means to intercept a second part of said mixed light portion to provide a second mixed light signal whose value is equal to $$A \cos (Bx-C).$$

8. An apparatus as in claim 7 wherein said signal analyzing means comprises:
an adder means connected to said first detector and said second detector with an output terminal means for providing a first sum signal equal to said first mixed signal plus said second mixed signal wherein said first sum signal is a sinusoidal function with an argument that is equal to said displacement phase, Bx;
a subtractor means connected to said first and second detectors with an output terminal means for providing a difference signal equal to said first mixed signal subtracted from said second mixed signal wherein said difference signal is sinusoidal with an argument equal to said displacement phase and said difference signal is in quadrature with respect to said first sum signal;
means for determining said phase common to said first sum signal and said difference signal with input terminals connected to said first adder means and said subtractor means and an output terminal where a signal proportional to said displacement phase is presented.

9. An apparatus as in claim 8 wherein said displacement phase determining means comprises:
a ring counter with an input up pulse terminal means and an input down pulse terminal means and an output terminal means for presenting a total pulse count equal to a number of said up pulses minus a number of said down pulses;
a sine eprom means including an input terminal means connected to said ring counter output terminal means and an output terminal means where values of the sine function are presented whose argument is proportional to said total pulse count;
a first multiplication means for multiplying said sine value by said sum signal including input terminal means connected to said sine eprom output terminal means and said first adder output terminal means and including output terminal means;
a cosine eprom means including an input terminal means connected to said ring counter output terminal means and an output terminal means where values of the cosine function are presented having a count argument proportional to said total pulse count;
a second multiplication means for multiplying said cosine value by said difference signal including input terminal means connected to said cosine eprom output terminal means and said substractor output terminal means, said second multiplication means having output terminal means;
a second adder having input terminal means connected to said output terminal means of said first and second multiplication means and having second adder output terminal means providing that a sine signal is generated on said second adder output terminal means whose argument equals a difference between said phase and said count argument;
a gated pulse generator means including an input gate terminal means connected to said output terminal means of said second adder and an output up terminal means that puts out pulses when said sine signal is positive and output down terminal means that puts out pulses when said sine signal is negative and no pulses when said sine signal is zero;
said output up and down terminal means of said generator means connected to said input up and down terminal means of said ring counter respectively;
means for displaying said total number of pulses with input terminal means connected to said generator output terminals.

10. An apparatus as in claim 2 wherein said signal analyzing means comprises:
a dc beam splitter positioned to split said diffracted beam to produce a reflected diffraction beam and a transmitted diffraction beam;
a dc photo detector positioned to receive said reflected diffraction beam and emit a dc signal responsive to said reflected interference beam;
a second beam splitter means positioned to receive said transmitted diffraction beam and generate a reflected transmission diffraction beam and a transmission transmission diffraction beam;

a first lined mask means positioned in operable combination with said first and second beam splitters and said grating for intercepting said reflected transmitted interference beam to produce a first substantially periodic transmission moire light pattern having a displacement phase proportional to said grating displacement;

a reflection transmission photodetector positioned to receive light from said first mask;

a second lined mask means positioned in combination with said first and second beam splitters and said grating for intercepting said transmitted interference beam to produce a second substantially periodic transmission light pattern having a displacement phase proportional to said grating displacement and in quadrature with said first pattern;

a photodetector positioned to receive said second light pattern from said second mask thereby providing that said displacement phase may be determined from said first and second signals in quadrature with one another.

11. An apparatus as in claim 2 wherein said signal analyzing means comprises:

a vibrating means on which said beam splitting means in mounted for imparting vibratory motion to said beam splitter providing that said mixed portion of said diffraction beam oscillates spatially;

a photodetector located to intercept said spatially oscillating diffraction beam providing that said photodetector will emit an oscillating signal having an amplitude that is proportional to said displacement of said diffracting means.

12. An apparatus as in claim 1 wherein said signal producing means comprises:

a signal sensing membrane means with a surface coincident with said plane for sensing intensity of light through said membrane.

13. An apparatus as in claim 1 which comprises
a third base;

means for slidably supporting said second base on said third base wherein said sliding means permits said second base to be posioned along a direction parallel to said displacement direction;

means responsive to said displacement signal for applying a restoring force to said second base in a direction and magnitude to restore said first base to an initial position;

means for displaying said restoring force thereby providing an apparatus for measuring force with no net displacement.

14. A method for measuring displacement which includes the steps:

directing a light beam onto a means for diffracting light;

placing a means for generating a signal responsive to a light pattern on a flat plane that is substantially perpendicular tp said grating surface and parallel to said initial light beam and grating lines;

15. A method as in claim 14 wherein said generating means comprises a beam splitter including a partially reflecting surface coincident with said plane.

16. A method as in claim 14 wherein said generating means includes a transmission membrane wherein said transmission membrane emits a signal responsive to changes in said light pattern.

17. An apparatus for determining a phase of a first sinuosoidal function in quadrature with a second sinusoidal function having an equal amplitude which comprises:

a ring counter with an input up pulse terminal means and an input down terminal means and an output terminal means for presenting a total pulse count equal to a number of said up pulses minus a number of said down pulses;

a sine eprom means including a an input terminal means connected to said ring counter terminal means and an output terminal means where values of the sine function are presented whose argument is proportional to said total pulse count;

a first multiplication means for multiplying said sine value by said first signal including input terminal means connected to said sin eprom output terminal means and said first signal terminal means and including output terminal means;

a cosine eprom means including an input terminal means connected to said ring counter means and an output terminal means where values of the cosine function having a count argument proportional to said total pulse count;

a second multiplication means for multiplying said cosine value by said second signal including input terminal means connected to said cosin eprom output terminal means, said second multiplication means having output terminal means;

an adder including input terminal means connected to said output terminal means of said first and second multiplication means and having adder output terminal means providing that a sine signal is generated on said adder output terminal means whose argument is equal to a difference between said phase and said count argument;

a gated pulse generator means including an input gate terminal means connected to said output terminal means of said adder and an output up terminal means that puts out pulses when said sine signal is positive and an output down terminal means that puts out pulses when said sine signal is negative and no pulses when said sine signal is zero;

said output up and down terminal means of said generator means connected to said up and down input terminal means of said ring counter respectively;

means for displaying said total number of pulses with input terminal means connected to said generator output terminals.

* * * * *